United States Patent
Barrett et al.

(10) Patent No.: US 7,917,430 B2
(45) Date of Patent: Mar. 29, 2011

(54) BANKRUPTCY EVALUATION SERVICE AND SYSTEM

(75) Inventors: Melyssa Barrett, Tracy, CA (US); E. Christopher Lundquist, San Mateo, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 11/554,721

(22) Filed: Oct. 31, 2006

(65) Prior Publication Data
US 2007/0299767 A1    Dec. 27, 2007

Related U.S. Application Data

(60) Provisional application No. 60/816,129, filed on Jun. 22, 2006, provisional application No. 60/818,261, filed on Jun. 29, 2006.

(51) Int. Cl.
*G06Q 40/00* (2006.01)
(52) U.S. Cl. ............................................. 705/38; 705/35
(58) Field of Classification Search ................ 705/35–45
See application file for complete search history.

(56) References Cited

U.S. PATENT DOCUMENTS

| | | | | |
|---|---|---|---|---|
| 2003/0028477 A1* | 2/2003 | Stevenson et al. | ............... | 705/38 |
| 2003/0033229 A1* | 2/2003 | Keyes et al. | ..................... | 705/36 |
| 2003/0135450 A1* | 7/2003 | Aguais et al. | ..................... | 705/38 |
| 2004/0064404 A1* | 4/2004 | Cohen et al. | ..................... | 705/38 |
| 2006/0085330 A1* | 4/2006 | Imrey et al. | ..................... | 705/39 |

OTHER PUBLICATIONS www.Moranlaw.net, Web Archive, Jan. 18, 2006.*
www.Moranlaw.net, Web Archive, Dec. 11, 2006.*
www.Moranlaw.net, Web Archive, Nov. 24, 2005.*
www.13datacenter.com, Web Archive, Apr. 1, 2002.*
Chapter 13 Case No. 02-36535 (CGM), United States Bankruptcy Court, Nov. 18, 2005 ("Chapter13").*
Chapter 13 Case No. 02-36535 (CGM), United States Bankruptcy Court, Nov. 18, 2005.*

* cited by examiner

*Primary Examiner* — Hani Kazimi
*Assistant Examiner* — Clifford Madamba
(74) *Attorney, Agent, or Firm* — Kilpatrick Townsend & Stockton LLP

(57) ABSTRACT

A method for assigning a value to a debt is disclosed. The method includes entering, into a digital computer, bankruptcy data associated with a bankruptcy proceeding after a debtor has filed for bankruptcy. The bankruptcy data may include priority claim data associated with priority claims, non-precedence claim data associated with non-precedence claims, and bankruptcy plan data. After the bankruptcy data are obtained, the digital computer determines a present value associated with at least one non-precedence claim in the non-precedence claims.

29 Claims, 5 Drawing Sheets

FIG. 4

BANKRUPTCY EVALUATION SERVICE AND SYSTEM

CROSS-REFERENCES TO RELATED APPLICATIONS

This application is a non-provisional of U.S. Patent Application No. 60/816,129, which was filed on Jun. 22, 2006, and 60/818,261, which was filed on Jun. 29, 2006, which are herein incorporated by reference in their entirety for all purposes.

BACKGROUND

When a person files for bankruptcy under Chapter 13 of the Bankruptcy Code, the person's goal is to have the opportunity to repay some or all of his debts, under better terms (e.g., with lower or no interest). Unlike a Chapter 7 bankruptcy, Chapter 13 allows the debtor to use whatever income he may have in the future to pay off creditors. A Chapter 13 bankruptcy is particularly applicable for a debtor who has a regular income. In a typical Chapter 13 bankruptcy proceeding, the United States Bankruptcy Code gives the debtor 5 years to pay creditors back.

In a Chapter 13 bankruptcy proceeding, the entire process is carried out under the supervision of the courts, with the aid of a Chapter 13 Trustee. While a debtor is allowed to keep all exempt property, the court approves a new proposed plan for repayment. A written plan is created giving details of all the transactions that will occur, and the duration of the same. The repayment must begin within thirty to forty-five days after the case was filed.

One advantage of a Chapter 13 proceeding is that unsecured creditors may receive payment on debts ordinarily discharged without payment in a Chapter 7 proceeding. For example, if a debtor manages to complete all necessary payments in a Chapter 13 plan, he is given a fall plan discharge. Yet another advantage of filing for Chapter 13 bankruptcy is that a repayment plan can be created for the debtor even if creditors disagree with it, as long as it is approved by the Court. Although, creditors may file an objection to the plan, in case they have any.

In the Chapter 13 proceeding, there are different types of creditors. They include secured creditors, priority creditors, and unsecured creditors. A secured creditor has a secured claim against the debtor. A "secured claim" is a claim that is secured by a lien in the debtor's property by reason of the debtor's agreement or an involuntary lien such as a judgment or tax lien. The creditor's claim may be divided into a secured claim, to the extent of the value of the collateral, and an unsecured claim equal to the remainder of the total debt. Generally, a secured claim must be perfected under applicable state law to be treated as a secured claim in the bankruptcy. Certain debts, such as unpaid wages, spousal or child support, and taxes are elevated in the payment hierarchy under the Code. These are "priority claims". Priority claims must be paid in full before general unsecured claims are paid. An unsecured creditor has an "unsecured claim" against the debtor. A claim or debt is unsecured if there is no collateral that is security for the debt. Most consumer debts including credit card debts are unsecured.

In a Chapter 13 proceeding, the secured creditors are paid first. The priority creditors are paid next, and the unsecured creditors are paid last. Unsecured creditors such as credit card issuers may not see any debt payments until late in the Chapter 13 bankruptcy proceeding (e.g., after 36 months), and they will typically receive only a fraction of the original debt owed to them. In addition, sometimes, the Chapter 13 debtors may become unemployed during the Chapter 13 proceeding so there is always some risk that the unsecured debtors will receive less than what is anticipated during the Chapter 13 proceeding.

For these reasons, unsecured debt is sometimes sold by unsecured creditors to debt buyers. The debt buyers may purchase the unsecured debt from unsecured creditors for some reduced amount. Traditionally, debt buyers have estimated the value of unsecured debt based on their past experience buying debt. On the other hand, sellers of unsecured debt may not have the expertise or experience to value unsecured debt, and may inadvertently sell the debt for less than what is worth. Accordingly, there is a need to help sellers (or even buyers) assign a present value to unsecured debt.

Embodiments of the invention address these and other problems individually and collectively.

SUMMARY

Embodiments of the invention are directed to methods, systems, and computer readable media for valuing debt and processing bankruptcy data.

One embodiment of the invention is directed to a method comprising entering bankruptcy data into a digital computer. The bankruptcy data may comprise precedence claim data associated with precedence claims, non-precedence claim data associated with non-precedence claims, and bankruptcy plan data. After the bankruptcy data are obtained, the digital computer determines a present value for at least one non-precedence claim in the non-precedence claims.

Another embodiment of the invention is directed to a method comprising entering bankruptcy data associated with a plurality of different courts into a digital computer, preprocessing the bankruptcy data, and determining a present value associated with at least one claim using the digital computer and the preprocessed data.

Other embodiments are directed to computer readable media including code for causing a processor to perform the above methods, as well as servers and systems that can perform the above-described method and other methods.

These and other embodiments of the invention are described in further detail below with reference to the Figures and the Detailed Description.

BRIEF DESCRIPTION OF THE DRAWINGS

FIG. 4 shows a graphical user interface according to an embodiment of the invention.

DETAILED DESCRIPTION

Figure 1:
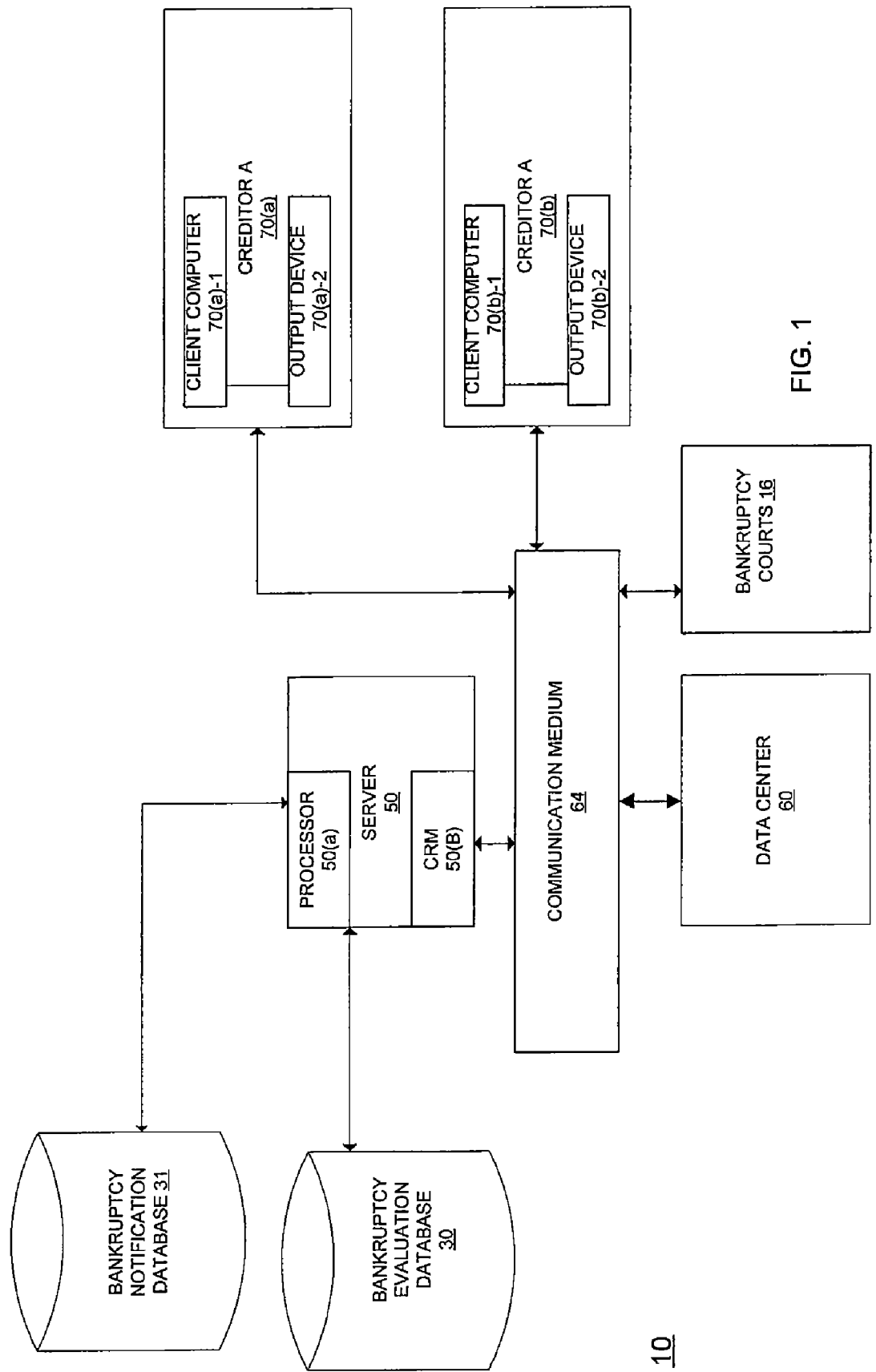
FIG. 1 shows a block diagram illustrating a system according to an embodiment of the invention.

One embodiment of the invention is directed to a method. The method comprises entering (either manually or automatically) bankruptcy data into a digital computer. The bankruptcy data are associated with a bankruptcy proceeding after a debtor has filed for bankruptcy. The bankruptcy data may comprise, among other things, secured claim data associated with secured claims, priority claim data associated with priority claims, and unsecured claim data associated with unsecured claims. After the bankruptcy data are obtained, the digital computer determines a present value for at least one non-precedence claim. The determined present value may be output to an appropriate output device such as a display device, an audio output device, printer, etc.

Embodiments of the invention allow buyers of debt, sellers of debt, and other entities to value bankruptcy debt. This way, sellers of debt can make appropriate business decisions regarding whether to keep the debt, sell the debt, or perhaps process the debt in-house.

Illustratively, a debtor may have an unsecured debt of $10,000 with a credit card issuer such as a bank. Because the bank is an unsecured creditor, it would be paid after precedence creditors such as secured and priority creditors are paid. The bank would receive a portion of the original $10,000 debt that it is owed over a period of time at the end of the bankruptcy proceeding. Consequently, at the beginning of the bankruptcy proceeding, the bank's unsecured claim against the debtor would have some reduced present day value.

Embodiments of the invention may be used to determine that the present day value of the unsecured debt. For example, embodiments of the invention may determine that the debt is worth $2000 or 20% of the original $10,000 that was owed by the debtor to the bank.

When the present value of the debt is known, the bank may decide whether to keep the debt and manage the debt in house (i.e., monitor the Chapter 13 proceeding and check for timely payments, etc.), keep the debt and use a contractor to manage the debt, or sell the debt to a debt buyer. In addition, if the bank wants to sell the debt to a debt buyer, the bank will know approximately how much the debt is actually worth so that the bank can make a decision regarding whether or not a debt buyer is paying fair value for the debt. For example, if a debt buyer offers a bank $1000 for the unsecured debt that embodiments of the invention determine to be worth $2000, the bank may decide to keep the debt rather than sell it.

The present value of the debt is determined using a digital computer. As used herein, a general purpose programmable "digital computer" may include a memory including one or more volatile or non-volatile memory components such as a ROM (read-only memory) and a RAM (random access memory), a processor such as a CPU (microprocessor), at least one input port and at least one output port. A digital computer according to an embodiment of the invention may be embodied by one or more computational apparatus that are connected to a communication medium. For example, a digital computer according to an embodiment of the invention may be embodied by a server computer, or even a client computer, that is coupled to a communication medium such as the Internet. In other embodiments, the digital computer may be a stand alone computer that may or may not be connected to an external communication medium.

As will be explained in further detail below, embodiments of the invention may be used to value claims such as non-precedence claims in a bankruptcy proceeding, or claims that may be filed in a bankruptcy proceeding that may occur in the future. As used herein, a "precedence claim" includes any type of claim which may be paid prior to a "non-precedence claim." In one embodiment, precedence claims comprise secured claims and priority claims, while non-precedence claims comprise unsecured claims. In another example, precedence claims may comprise secured claims while the non-precedence claims comprise priority claims and/or unsecured claims.

A number of specific examples are described in detail below to illustrate embodiments of the invention. The examples that are specifically described below are directed to the valuation of at least one unsecured debt in a Chapter 13 bankruptcy proceeding. However, embodiments of the invention are not limited to this example. Embodiments of the invention can be used to value debts in any type of proceeding where there are some creditors will be paid before other creditors. For example, embodiments of the invention may be used to value priority debts and other types of debts in a Chapter 13 proceeding. Embodiments of the invention may also be used to value debts in other bankruptcy proceedings such as Chapter 11 bankruptcy proceedings.

FIG. 1 shows a schematic block diagram of a system 10 according to an embodiment of the invention. The system 10 includes a server computer 50 which is in operative communication with a bankruptcy evaluation database 30, and a bankruptcy notification database 31. The bankruptcy databases 30, 31 may be written in MSSQL 2000 or using any other suitable protocol. They may be directly connected to the server computer 50 as shown in FIG. 1, or connected to the server computer 50 through a communication medium 64.

The server computer 50 is also in operative communication with bankruptcy courts 16, a data center 60 and various creditors 70(a), 70(b) through the communication medium 64. The server computer 50 may be a commercially available server computer that may be purchased from a server manufacturer such as Dell®. Although FIG. 1 shows one server computer 50, one bankruptcy evaluation database 30, and two creditors 70(a), 70(b), it is understood that embodiments of the invention may include more or less components than are shown in FIG. 1.

The creditors 70(a), 70(b) may be banks, retail stores or any other suitable businesses that have extended credit to the debtor. Exemplary debtors may include individual consumers, businesses, and the like. In preferred embodiments, the creditors 70(a), 70(b) are unsecured creditors such as banks which hold credit card debt. Each creditor 70(a), 70(b) may have at least one client computer 70(a)-1, 70(b)-1, and an output device 70(a)-2, 70(b)-2 coupled to the at least one client computer 70(a)-1, 70(b)-1.

The server computer 50 may be embodied by one or more computational apparatuses, which can service the requests of one or more client computers. Typically, the server computer 50 is a powerful computer or cluster of computers that behave as a single computer. For example, the server computer 50 can be a mainframe computer, a minicomputer, or a minicomputer cluster. In another example, the server computer 50 may include one or more database servers and one or more Web servers. The server computer 50 may service the requests of one or more client computers (e.g., client computers 70(a)-1, 70(b)-1, or any client computers at the data center 60).

The data center 60 may be any suitable entity that aggregates bankruptcy data from various bankruptcy data sources. For example, the data center 60 may be the National Data Center or NDC. The NDC consolidates case information in electronic form for all participating Chapter 13 trustees. Data that passes between the server computer 50 and the data center 60 may be transmitted in a secure manner (e.g., the data may be encrypted). Also, all files passing between the server computer 50 and the data center 60 can be zipped and password protected if desired.

As shown in FIG. 1, the server computer 50 includes a processor 50(a), and a computer readable medium (CRM) 50(b). The processor 50(a) may include one or more general purpose microprocessors, which may execute instructions stored on the computer readable medium 50(b). The computer readable medium 50(a) may utilize any suitable combination of volatile or non-volatile, electrical, optical, magnetic, or electro-optical memory components for storing computer code, which may be executable by the processor

50(*a*). Examples of suitable computer readable media include magnetic disks, memory chips, etc. In embodiments of the invention, different types of data storage mechanisms may form a single computer readable medium. For example, data stored on separate disk drives on separate computational apparatuses may form a computer readable medium in embodiments of the invention.

The bankruptcy evaluation database 30 and the bankruptcy notification database 31 may each store bankruptcy data. In some embodiments, the bankruptcy notification database 31 may comprise initial bankruptcy information such as case name, case docket number, debtor account number(s), court name, creditor name, or any suitable identifiers thereof (e.g., numerical codes associated with various creditor names). The initial bankruptcy information may be included in a request to the data center 60 to retrieve additional bankruptcy data which is stored in the bankruptcy evaluation database 30 so that a debt evaluation can be performed. As will be explained in detail below, the additional bankruptcy data that are retrieved from the data center 60 may include case file information, claim file information, creditor file information, payment file information, receipt file information, debtor file information, and request out information. This additional bankruptcy information may be used to determine the present values of debts.

The communication medium 64 may including any suitable combination of communication lines, channels, and radio interfaces, used to exchange information between the server computer 50 and any client computers or other computational apparatuses. According to one embodiment, the communication medium 64 may include, for example, the Internet, an intranet, the public switched telephone network (PSTN), or a wireless telephone or radio network. According to one embodiment, the server computer 50 and various client computers may communicate via the network 16 using a TCP/IP based protocol. In one embodiment, the communication medium 64 could comprise a payment processing network such as VisaNet™.

Figure 2:
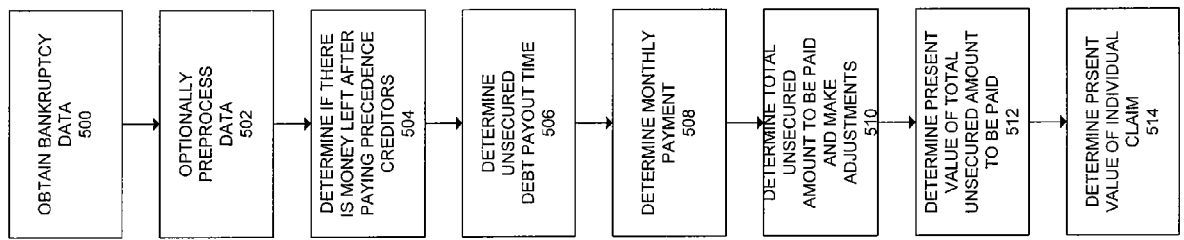
FIG. 2 shows a general flowchart illustrating a method according to an embodiment of the invention.

FIG. 2 shows a flowchart illustrating a general method according to an embodiment of the invention. The method can be used to determine a value of an unsecured debt in a Chapter 13 bankruptcy proceeding. The illustrated method comprises obtaining bankruptcy data (step 500). Initial bankruptcy data such as case docket number, debtor name, and other basic information are used to retrieve additional bankruptcy data from a data source such as a data center. After the additional bankruptcy data are retrieved, a digital computer may preprocess the initial and additional bankruptcy data that are obtained (step 502). This can be done so that the bankruptcy data are processed more accurately and efficiently at a later time. For example, assumptions can be made for bad or missing data points so that the valuation method can still proceed despite presence of bad or missing data points in the raw data received from the data center. At some point, the digital computer uses the bankruptcy data to determine if there is any money left after paying the precedence creditors (step 504), the unsecured debt payout time (step 506), and the monthly payment being made by the debtor (step 508). These steps may be performed in this order or in a different order in embodiments of the invention. The digital computer then determines the total unsecured amount to be paid for all creditors, and then makes adjustments to the total unsecured amount (step 510). Once the total unsecured amount to be paid is obtained, the total present value of the unsecured claims for all unsecured creditors is determined (step 512). Once the present value of the total unsecured amount to be paid is determined, the present value of an individual debt claim may be determined (step 514).

Figure 3A:
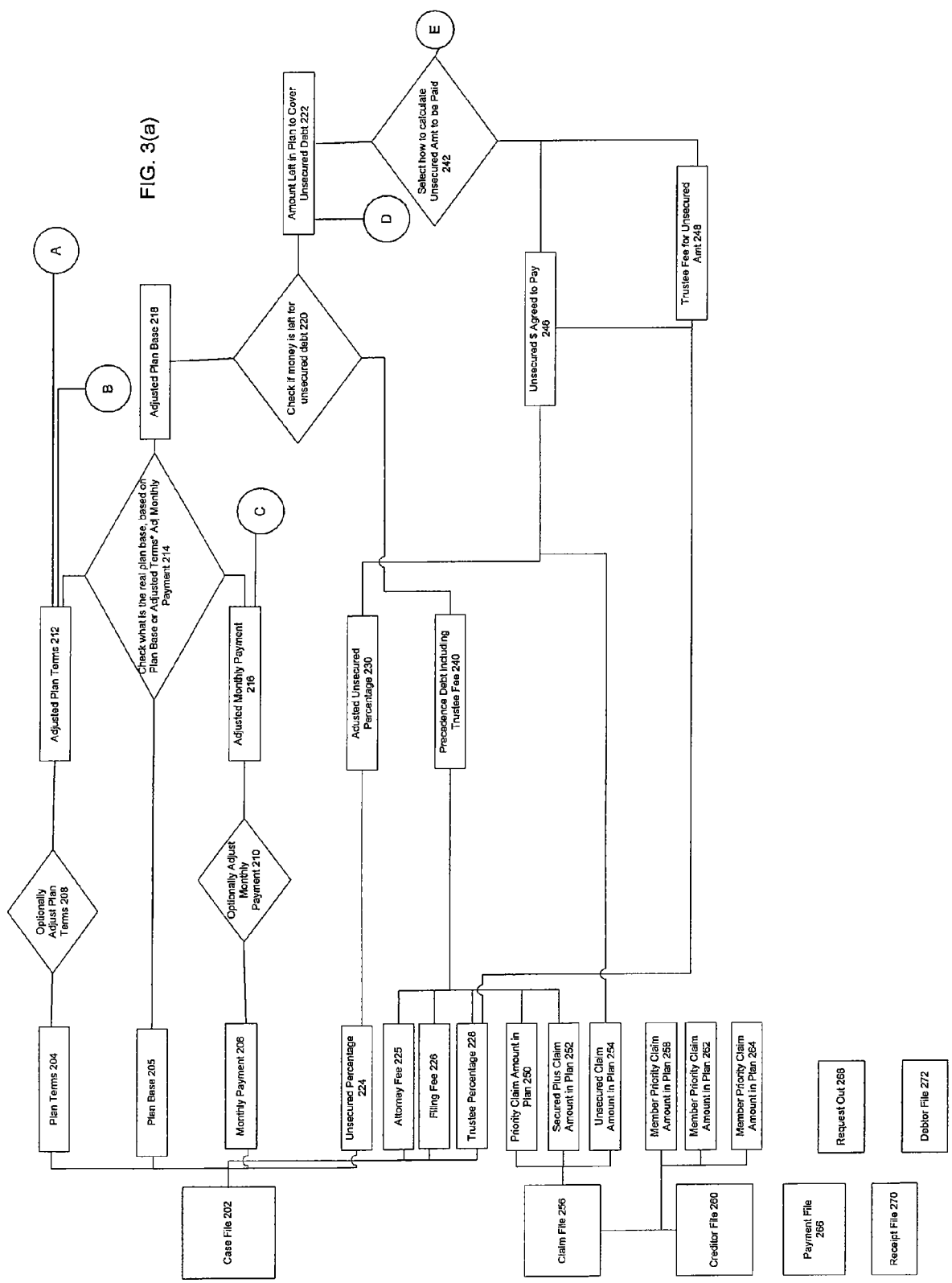
FIGS. 3(a)-3(b) show a specific flowchart illustrating methods according to embodiments of the invention.
Figure 3B:
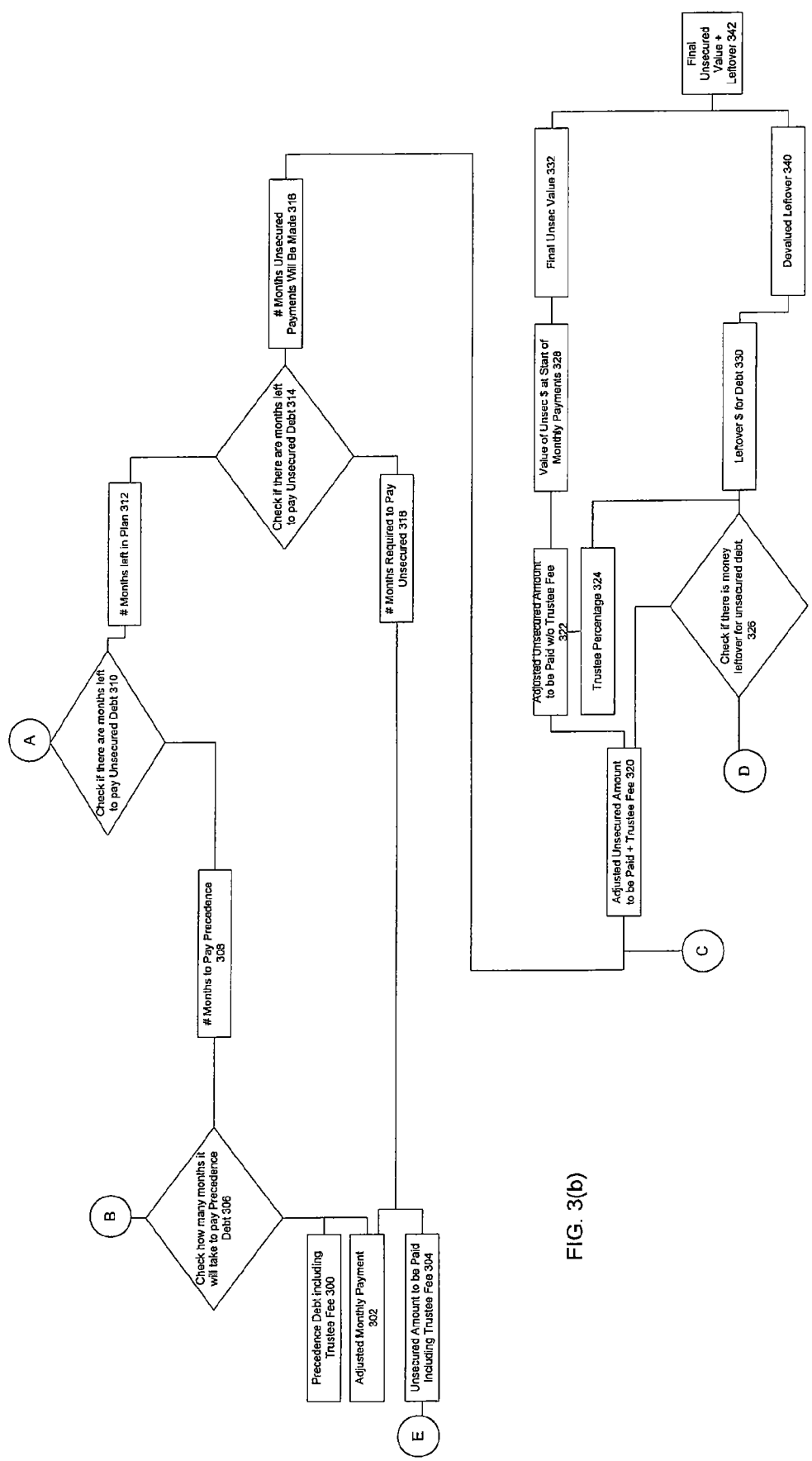

FIGS. 3(*a*)-3(*b*) show a more detailed flowchart illustrating a method for determining the value for an unsecured debt in a Chapter 13 bankruptcy. In the flowchart, the rectangular blocks are generally intended to illustrate inputs and outputs, while the diamond blocks illustrate functions that can be performed. Additional functions, which are not explicitly shown in FIGS. 3(*a*)-3(*b*) will be described in the following text description of these Figures. FIGS. 3(*a*)-3(*b*) are also described with reference to the system shown in FIG. 1.

The method shown in FIGS. 3(*a*)-3(*b*) assumes a "pot plan" bankruptcy proceeding. A "pot plan" is a plan whereby everyone files a claim, and the money left over to unsecured debt gets divided between everyone who files a claim. In a non-pot plan bankruptcy proceeding, if a creditor does not file a claim, that creditor's potential recovery could go back to the debtor, instead of the other creditors who did file claims. For example, a debtor may owe $1000 to each of 10 unsecured creditors. If only 9 creditors file claims in a pot plan bankruptcy proceeding, then the 9 creditors split the amount that will be paid to the unsecured creditors. In a non-pot plan bankruptcy proceeding, the unsecured pot of money may shrink by the amount associated with the claim that was not filed with the bankruptcy court. The debtor may keep the share that the non-filing creditor would have received in the bankruptcy proceeding. Embodiments of the invention may utilize either pot or non-pot plans.

Referring to FIGS. 3(*a*)-3(*b*) and FIG. 1, bankruptcy data are retrieved from the data center 60 by the server computer 50 after the server computer 50 sends a requester file to the data center 60. The files that come back from the data center 60 may be in a ".txt" format or other suitable data format.

The requestor file may be created using information from various bankruptcy notification service databases 31. Information from the bankruptcy notification service databases may include Bankruptcy Notification Services (BNS) or Bankruptcy Information Service (BIS) court number, EBN (electronic bankruptcy notification) district, EBN division, Petition Sequence Number, Case Number, Debtor SSN (social security number), Account Number(s), Filing Date, Trustee Name, Trustee City, and Trustee State. The information in the bankruptcy notification database 31 may have previously been obtained from the courts 16 by the server computer 50.

In some embodiments, when sending a requestor file to the data center 60, debtor account numbers (e.g., debtor credit card account numbers) that are known to the creditors 70(*a*), 70(*b*) may not be sent to the data center 60 to ensure that the actual account numbers of the debtors are not compromised. Alternatively, proxy numbers corresponding to the account numbers may be sent to the data center 60. In either case, the requester file that is sent to the data center 60 may be formatted so that it is compatible with processing performed by the data center 60.

After the data center 60 receives the requester file, the data center 60 takes a predetermined amount of time (e.g., 24 hours) to retrieve the requested data, and then sends a return file back to the server computer 50. The return file comprises bankruptcy data including case file information 202, claim file information 256, creditor file information 260, payment file information 266, receipt file information 270, request out file information 268, and debtor file information 272. Greater or fewer types of information may be retrieved from by the server computer 50 in other embodiments of the invention. The information in each of the foregoing file types is described in farther detail below.

From the claim file information 256 and creditor file information 260, it is possible to determine any member (e.g., bank) priority claim amounts in the plan (258, 262, 264). A requestor status report with this and other information can be generated, if desired.

Claim file information 256 includes the actual claims that are filed against the bankruptcy case. Claim file information 256 includes information relating to the types and number of claims on file. For example, claim file information 256 may include information such as the number of secured, priority, and unsecured claims, and the owners of such claims, and the amounts associated with such claims. It may also include information about the various amounts paid to date on claims, the amounts of original claims, percentages, the latest creditors on file at the trustee's office for the claims, etc. In FIG. 3(a), the claim file 256 includes information about each claim in the bankruptcy case. Such information includes priority claim amount in the plan 250, secured plus claim amount in the plan 252, and unsecured claim amount in the plan 254.

The creditor file 260 includes mapping information on the creditors including information mapping the names of the creditors to various identification codes. In other files, creditors are represented by the identification codes. Creditor data is related to claim, payment, and receipt records. Included in this file is the address and contact information for each creditor.

The payment file 266 includes information regarding distributions that are made by the trustee in a Chapter 13 proceeding. This file may include information about payments that the debtor makes to the trustee as well as payments that the trustee makes to the various creditors. Payment information includes the date a payment was made, the amount thereof, the name of the creditor paid, etc.

The request out file 268 includes a lookup table that matches what is sent to the trustee. It contains all of the requestor file fields plus an issuer (status) code as well as the trustee ID and case number for the matching case.

The debtor file 272 includes information about the debtor. This information may include debtor name, debtor social security number, etc.

The case file 202 comprises case level information such as debtor name, judges, status, case number, trustee information, plan term information 204, plan base information 205, monthly payment information 206, unsecured debt percentage information 224 (relative to the entire debt amount), attorney fee information 224, filing information 226, and trustee percentage information 228. The trustee percentage is the percentage amount that the trustee receives on all payments made from the plan.

Plan term information 204 may comprise information regarding the terms of the plan. For example, plan term information may include the length of the bankruptcy proceeding. The length of a typical Chapter 13 bankruptcy proceeding may be 36, 48, or 60 months.

Plan base information 205 may comprise information regarding how much money the debtor is required to pay back to all creditors under the plan. This amount of money is determined by the trustee under the supervision of the bankruptcy court. For example, if a debtor has $100,000 in debt, the plan base may be $60,000. The $60,000 may have to be paid back to the various creditors over a predetermined time (e.g., five years). Another way to define a "plan base" is the amount of money in a plan that is used to pay off debts and related fees.

The unsecured percentage 224 may be the percentage of unsecured debt as set by the trustee and that the debtor agrees to pay. For example, the trustee indicates what percentage of each type of claim will be paid back. For example, the trustee may decide that 100% of the secured and priority claims will be paid back, but that only 20% of the unsecured debt will be paid back.

Monthly payment information 206 may comprise information regarding how much the debtor's monthly payment will be under the plan. The debtor's monthly payment under the plan is also determined by the trustee under the supervision of the bankruptcy court. If this information is not available, it may be calculated by dividing the plan base by the number of months in the plan.

The claim file 256 includes information about the claims that have been filed in the bankruptcy proceeding. In this example, the claim file 256 includes information about the priority claim amount in the plan 250, the secured claim amount in the plan 252, and the unsecured claim amount in the plan 254.

The creditor file 260 includes information about the creditors that have filed claims in the bankruptcy proceeding. Creditor file information 260 may include information such as the name of the creditor, when the creditor filed a bankruptcy claim, etc. It is preferable to know who the creditors are so that the server computer 50 knows which creditor is associated with the claim that is being processed.

Bankruptcy data such as the plan term information 204, the plan base information 205, and the monthly payment information 206 may be preprocessed in any suitable manner, before the bankruptcy data is actually manipulated to determine the present value of unsecured debt. Preprocessing bankruptcy data is desirable, because there are multiple trustees associated with different bankruptcy proceedings and different courts in the country. The way that the trustees submit their data to the data center 60 is dependent upon the way that they manage their cases. Various bankruptcy trustees may provide data to the data center 60 inconsistently, and the preprocessing step can help to standardize the data that is received from the data center 60. Also, sometimes, data that are received from the data center 60 may be missing and/or inaccurate, and preprocessing the data can help address these problems.

The plan term information 204 may be optionally preprocessed 208 to form adjusted plan terms 212. The raw plan term information 204 may be preprocessed to scrub any potentially inaccurate data that may have been retrieved from the data center 60. For example, raw plan term information may be obtained and preprocessed using one or more of the following rules: if the plan term=0 months, then use 60 months; if the plan term>84 months, then use 60 months; and if the plan term<12, then use 60 months.

The plan base information 205 may also be optionally preprocessed 214 to form an adjusted plan base 218. For example, the preprocessed plan base may take the greater of the adjusted plan terms times the monthly payment, and the plan base that is in the case file 202. In theory, the plan base in the case file 202 received from the data center 60 should equal to the adjusted terms times the monthly payment, but these values may not be equal in practice.

The monthly payment information 206 may also be optionally preprocessed 210 to form an adjusted monthly payment 216. For example, if no monthly payment information is provided in the case file 202, it is possible to divide the adjusted plan base by the adjusted plan term to determine the monthly payment.

The unsecured percentage 224 may also be optionally preprocessed to form an adjusted unsecured percentage 230. For example, the unsecured percentage 224 may be processed as follows: if the absolute value of the unsecured percentage is greater than 1, then take the absolute value of the unsecured percentage and divide by 100. Otherwise, use the absolute value of the unsecured percentage. Sometimes, unsecured percentages are received as negative values from the data center 60, so taking the absolute value corrects for this. In addition, the division by 100 is used to change the percentage value received from the data center 60 into a decimal format.

The amount of precedence debt 240 is also determined. In this particular example, "precedence debt" includes any debt which would be paid before an unsecured debt. Precedence debt includes secured claims, priority claims, trustee fees, filing fees, attorney fees, etc.

Once the adjusted plan base 218 is determined, and once the precedence debt 240 is determined, these two numbers can be subtracted from each other to determine 220 if there is anything left in the plan to cover the unsecured debt 222. Sometimes, there is no unsecured debt after the precedence debt is paid. Other times, there is money left. For example, if the adjusted plan base is $100,000 and the precedence debt is equal to $60,000, then $40,000 would be left to pay unsecured debt.

Another way to calculate the amount of unsecured debt in the plan is to take the unsecured claim amount 254 in the plan, and then multiply this number by the adjusted unsecured percentage 230. This gives one the amount 246 that the unsecured debtor agreed to pay. For example, the total of all unsecured claims may be $100,000 and the unsecured percentage may be 40% so $40,000 would be left to pay unsecured debt.

Adjustments may also be made using the trustee fee 248, which may be determined by multiplying the amount that the unsecured debtor has agreed to pay 246 by the trustee percentage 228. The determined unsecured claim amount is reduced by the trustee fee 248, since the unsecured creditors will not receives fees that are being paid to the trustee.

In theory, the calculated unsecured amount should equal the amount previously determined above with respect to box 222. However, these numbers may not match in practice. Therefore, as shown by function 242, a digital computer such as a server computer selects how to calculate the unsecured amount to be paid.

As explained above, there are two ways to get the unsecured amount to be paid. One way is to calculate the unsecured amount based on the plan, and to subtract precedence fees. The amount that is left is the unsecured amount to be paid. The other way is to multiply the unsecured claim amounts and the unsecured percentage. In embodiments of the invention, the unsecured amounts to be paid are calculated using these two methods and the smaller amount is taken to be the unsecured amount to be paid. This results in a more conservative estimate. However, 0% unsecured plans may cause the unsecured amount to be paid to be $0, even though many times 0% plans are not representative of the actual unsecured % payback. Therefore, as an additional rule, the digital computer may perform this comparison and take the lower amount, only if the unsecured percentage is not zero.

Before or after the unsecured amount to be paid is calculated, the digital computer can determine how many months it will take to pay back the unsecured amount to be paid. Taking the adjusted plan terms 212, one may determine how many months that it will take to pay the precedence debt 306. For example, the digital computer may take the total amount of precedence debt and may divide this by the debtor's monthly payment, thereby determining the number of months required to pay the precedence debt 308. For example, if there is $20,000 in precedence debt, and the monthly payment is $2000, then it will take 10 months to pay the precedence debt.

If the adjusted monthly payment is $0, then use $0. Otherwise, compare the precedence debt including the trustee fee 300 divided by the adjusted monthly payment 302, and the adjusted plan terms 212, and take the lower of the two. This determines if the precedence fees will use up all the months of payments. For example, if there is $20,000 in precedence debt (including the trustee fee) and the adjusted monthly payment is $2000, then the months to pay precedence debt is 10 months. If the plan is 24 months, then there the digital computer would select 10 months as the lower of 10 months and 24 months.

Then, the digital computer checks to see if there are months left to pay the unsecured debt 310. It can subtract the number of months to pay precedence debt from the adjusted plan terms to see if there are any months left after the precedence debt is paid. Then, the number of months left in the plan is determined 312.

Another check is then made to see if there are months left to pay the unsecured debt 314. If the number of months left in the plan is 0, then this number of 0. Otherwise, take the lower of the number of months required to pay the unsecured amount 318 and the number of months left in the plan 312. For example, if it will take 10 months to pay precedence debt and there are 24 months in the plan, then there will be 14 months left in the plan to pay unsecured claims. If it will take 20 months to pay the unsecured debt, then use 14 months. The number of months required to pay the unsecured amount 318 may be determined using the adjusted monthly payment 302 and the unsecured amount to be paid including trustee fee 304.

Once the number of unsecured payments to be made is determined 316, this is multiplied by the adjusted monthly payment 218 to thereby obtain the adjusted unsecured amount to be paid plus trustee fee 320. For example, if the adjusted monthly payment is $2000 and the number of months of unsecured payments is 10, then the adjusted unsecured amount plus trustee fee would be $20,000. Then, the adjusted unsecured amount to be paid without trustee fee is obtained 322. For example, with respect to the above example, if the trustee fee is determined to be $1000, then adjusted unsecured amount to be paid without a trustee fee would be $19,000.

Using the adjusted unsecured amount to be paid without trustee fee 322 and the adjusted unsecured amount to be paid with trustee fee, the trustee percentage is determined 324.

The total present value of all unsecured claims at the start of the monthly payments 328 is then determined. The digital computer devalues the amount based on the number of months until the unsecured payments start. Then, a final overall unsecured value associated with all unsecured debts is determined 332. The value of the unsecured debt is devalued using the time when the unsecured payments will begin and the time at which the unsecured payments will end. The net present value of the payments, for example, may be determined between months 30 to 40, if unsecured payments are to be made between 30 and 40 months from the present date.

At some point, there is then a check to see if there is any money leftover for unsecured debt 326. Sometimes, the plan terms do not "equal" each other. For example, information received from the data center 60 may indicate that the plan base is $72,000, the monthly payment is $1000, and the plan term is 60 months. This results in $12,000 being "leftover." This leftover is added to the pot of unsecured payments and is labeled as "leftover."

Any leftover is determined 330, and is thereafter devalued to present value 340. The digital computer devalues the amount based on the number of months until the plan is complete.

Then, a final total unsecured value plus leftover amount is then determined 342. The leftover amount is assumed to be paid in a lump sum at the end of the plan (minus a trustee fee). For example, if the final unsecured value is $40,000 and the leftover is $12,000, then the total final unsecured amount to be paid plus leftover is $52,000.

Once the overall unsecured value, or the overall unsecured value plus leftover is determined, the present value of an individual unsecured claim may then be determined. For example, the ratio of the individual unsecured claim to the total of all unsecured claims can be determined. This can be used to determine the present value of the particular unsecured claim. For example, if the net present value of all unsecured claims is $100,000 and a particular creditor's claim was 10% of the overall value of unsecured claims, then the net present value of that creditor's claim would be $10,000. If that creditor's claim against the debtor was originally $60,000, the amount associated with the present value of the claim would be 16.7% of the original unsecured debt.

The table below illustrates the type of data that can be generated using embodiments of the invention. This data shows overall values associated with a hypothetical bankruptcy proceeding, the value of all unsecured claims owned by a bank A, and the value of a single claim by creditor B. In some cases, a score that is based on the determined present value may be calculated so that a user such as a bank can easily evaluate the likelihood of successful recovery in bankruptcy along with an estimated recovery value. Information such as this may be provided by any suitable output device (e.g., a printer, a display, etc.).

explained above, there are two ways to get the unsecured amount to be paid. One way is to calculate the unsecured amount based on the plan, and to subtract precedence fees. The amount that is left is the unsecured amount to be paid. The other way is to multiply the unsecured claim amounts and the unsecured percentage. In embodiments of the invention, the unsecured amounts to be paid are calculated using these two methods and the smaller amount is taken to be the unsecured amount to be paid. This results in a more conservative estimate. However, in other embodiments of the invention, a user could select the less conservative estimate if desired using an appropriate selection mechanism (e.g., a drop down menu on a Web page). Thus for function 242 in FIG. 3(*a*), the unsecured amount to be paid can be manually selected by a user, or automatically selected by a computer. Any other options in FIGS. 3(*a*)-3(*b*) or described herein may alternatively be manually selected by a user instead of automatically selected by a computer.

Embodiments of the invention have a number of advantages. First, embodiments of the invention allow creditors to determine the value of their claims in bankruptcy before the bankruptcy proceeding ends. In this way, the creditors may determine whether or not they want to keep the debt, or sell the debt. In addition, using embodiments of the invention, it is possible to even determine the value of creditors' debts even before a debtor files for bankruptcy or before a proof of claim is filed.

Embodiments of the invention have other advantages. For example, the National Data Center can aggregate Chapter 13 plan and payment data from U.S. trustees across the country. While the data files are in a standard format, the data is sometimes incomplete and inconsistent across different trustees. In addition, the data only provides point-in-time snap-

TABLE 1

|  | Overall | Multiple Claims of Bank A | Single Claim of Creditor B |
|---|---|---|---|
| Present Value of Unsecured Debt at Payoff (as a percentage of original debt) | 21.89% | 22.32% | 20.00% |
| Total Value of Unsecured Debt | $10,392,126,501 | $294,567,296 | $20,000 |
| Total Value of Unsecured Debt at Payoff | $2,275,294,054 | $65,745,980 | $4,000 |
| Total Value of Secured Debt | $3,692,822,863 | $73,623,216 |  |
| Avg Value of an Unsecured Claim | $4,685 | $6,245 |  |
| Avg Value of an Unsecured Claim at Payoff | $1,154 | $1,358 |  |
| Total Number of Cases in Analysis | 243,933 | 32,102 |  |
| Number of Claims in Analysis | 2,790,415 | 51,285 |  |
| Number of Unsecured Claims in Analysis | 2,207,137 | 42,354 |  |
| Avg # of Months Unsecured Payment Begins | 25 | 25 |  |

Although the embodiments of the invention described above with respect to FIGS. 3(*a*)-3(*b*) are quite detailed, embodiments of the invention may include any suitable combination and/or number of processing steps that are described with respect to FIGS. 3(*a*)-3(*b*) or shown in FIGS. 3(*a*)-3(*b*).

Also, a number of other features may be used in conjunction with embodiments of the invention and in conjunction with the processing steps in FIGS. 3(*a*)-3(*b*). For example, in the processes described with respect to FIGS. 3(*a*)-3(*b*), a user such as a bank may customize the data that is being input and/or the decisions that are being made so that the output corresponds to the user's desired output. For example, as shots of the trustees' databases. In addition to being able to value claims in a bankruptcy proceeding, embodiments of the invention can:

Identify the court and case number of each plan.

Identify an accurate, current case status for each plan.

Value each Chapter 13 plan, and creditors' cases.

Identify trends in the Chapter 13 plan valuation.

Identify which claims have been received by the trustee.

Identify additional potential recovery value by identifying unfiled proofs of claims.

Determine a consistent, statistically valid bankruptcy recovery value that can be compared against any selected group's recovery value(s).

Determine individual and selected group recovery scores (e.g., by city, state, zip, etc.) within a bankruptcy portfolio to determine those debts to retain and those to sell.

Determine bankruptcy scores up front, at the time of notification by a debtor—both before and after filing of a proof of claim.

As explained above, using embodiments of the invention, bankruptcy data may be cleansed, normalized, standardized, etc. in order to identify which court each plan belongs to and prepare data for further analysis. Additional charts, calculations, metrics, reports, and valuation models can be produced in order for data to be used in a) calculating the net present value of each Chapter 13 plan, b) determining which claims have been received by the trustee, and c) projecting plan liquidation curve and recovery rates. A liquidation curve can show a creditor how the creditor will be paid back over time. The data are merged with other data sources in order to provide more accurate, updated information on each case, such as case status and claim ownership.

Figure 4:
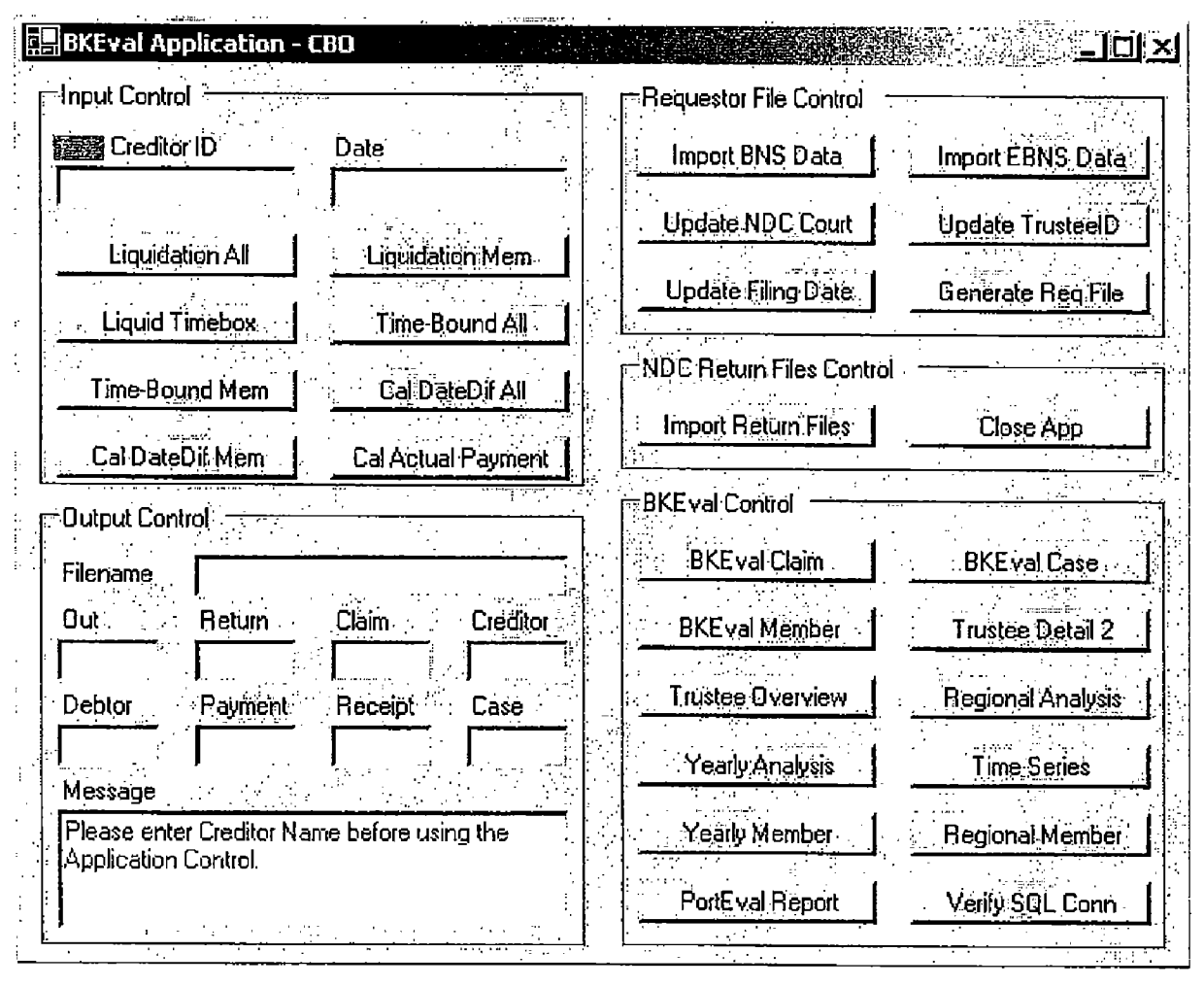

FIG. 4 shows an exemplary user interface that can be used in embodiments of the invention. The user of the user interface may be an operator who is using a digital computer that has software for performing the methods according to embodiments of the invention. A number of buttons are shown in FIG. 4. Each button is described in further detail below.

"Import BNS Data"—This button is for importing raw BNS (bankruptcy notification service) data into a BKEval (bankruptcy evaluation) database.

"Import EBNS data"—This button is for importing raw EBNS (electronic bankruptcy notification service) data into the BKEval (bankruptcy evaluation) database.

"Update NDC Court"—This button is for updating the NDC (National Data Center) court information to a requestor table in the BKEval (bankruptcy evaluation) database. The requestor table is used to create the requester file.

"Update TrusteeID"—This button is for updating the trustee information to the requester table in the BKEval (bankruptcy evaluation) database.

"Update Filing Date"—This button is for updating the filing date to the BKEval (bankruptcy evaluation) database.

"Generate Req File"—This button is for generating the requestor file for the National Data Center.

"Import Return Files"—This button is for importing all seven return files from National Data Center.

"Close App"—This button is for closing the BKEval (bankruptcy evaluation) application.

"BKEval Claim"—This button is for computing claim data for all cases.

"BKEval Case"—This button is for computing case data for all cases.

"BKEval Member"—This button is for computing case data for an individual creditor.

"Trustee Detail 2"—This button is for computing trustee detail part 2 that is based on trustee ID and case number.

"Trustee Overview"—This button is for computing data for each trustee ID.

"Yearly Analysis"—This button is for computing data each year for all claims.

"Regional Analysis"—This button is for computing data each region for all claims.

"Time Series"—This button is for computing data each month for all claims.

"Yearly Member"—This button is for computing data each year for an individual creditor.

"Regional Member"—This button is for computing data each region for an individual creditor.

"PortEval Report"—This button is for generating the final report.

"Liquidation All"—This button is for computing the liquidation curve for all creditors.

"Liquidation Mem"—This button is for computing the liquidation curve for a single creditor.

"Liquid Timebox"—This button is for computing the timebox for the liquidation curve.

"Time-Bound All"—This button is for computing the time-bound liquidation curve for all cases.

"Time-Bound Mem"—This button is for computing the time-bound liquidation curve for a single creditor.

"Cal DateDif Mem"—This button is for computing the Date Different for each claim (This can be used for both all claims and a claim for a single creditor).

"Cal Actual Payment"—This button is for computing the actual liquidation curve for all claims and a claim for a single creditor.

In other embodiments of the invention, it is possible for various users (e.g., banks) to share experiences via peer group reporting techniques. Such techniques allow users to compare their experiences with other users.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their fall scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   entering bankruptcy data into a digital computer, wherein the bankruptcy data comprises precedence claim data associated with precedence claims, non-precedence claim data associated with non-precedence claims, and bankruptcy plan data, wherein the bankruptcy plan data comprises plan term information, plan base information, and monthly payment information;
   preprocessing the bankruptcy data, wherein preprocessing the bankruptcy data, which comprises the plan term information, plan base information, and monthly payment information, comprises correcting for inaccurate or missing data in the bankruptcy data, and creating standardized bankruptcy data in a standard data format; and
   determining a present value associated with at least one non-precedence claim using the digital computer,
   wherein the method further comprises, before entering the bankruptcy data, sending a request to a data center for the bankruptcy data, wherein sending the request to the data center for the bankruptcy data comprises sending a requestor file to the data center, wherein the requestor file includes proxy numbers associated with debtor account numbers, and wherein the method further comprises
   receiving a return file from the data center, wherein the return file comprises case file information, claim file information, creditor file information, payment file information, request out file information, and debtor file information; and
   wherein the request out file information includes a trustee ID.

2. The method of claim 1 wherein the non-precedence claims comprise unsecured claims, and wherein the bankruptcy proceeding is a Chapter 13 proceeding.

3. The method of claim 1 wherein determining the present value comprises determining the present value associated with a single non-precedence claim, wherein the single non-precedence claim is an unsecured claim.

4. The method of claim 1 wherein the precedence claims comprise secured claims and priority claims.

5. The method of claim 4 wherein determining the present value associated with the at least one non-precedence claim using the digital computer comprises:
   determining if there is money left after paying precedence creditors;
   determining an unsecured debt payout time;
   determining a monthly payment; and
   determining a total unsecured amount to be paid.

6. The method of claim 1 wherein determining the present value comprises
   determining the present value of all non-precedence claims; and
   outputting the present value using an output device.

7. The method of claim 6 wherein the output device is a display device.

8. The method of claim 1 further comprising: outputting the present value on an output device.

9. The method of claim 1 wherein determining the present value associated with the at least one non-precedence claim using the digital computer comprises:
   determining if there is money left after paying precedence creditors;
   determining an unsecured debt payout time;
   determining a monthly payment; and
   determining a total unsecured amount to be paid.

10. The method of claim 1, wherein the case file information includes unsecured percentage information, wherein the unsecured percentage information is a percentage of debt set by a trustee and that a debtor agrees to pay.

11. The method of claim 10 wherein the case file information further includes attorney fee information, filing fee information, and trustee percentage information.

12. The method of claim 1 wherein the bankruptcy data is associated with a pot plan bankruptcy proceeding.

13. The method of claim 12 wherein the requestor file includes a trustee name, a trustee city, and a trustee state.

14. The method of claim 1 wherein the return file is received within 24 hours of sending the requestor file.

15. The method of claim 1 wherein determining the present value associated with the at least one non-precedence claim using the digital computer comprises:
   determining if there is money left after paying precedence creditors;
   determining an unsecured debt payout time;
   determining a monthly payment;
   determining a total unsecured amount to be paid; and
   determining a present value of the total unsecured amount to be paid.

16. A non-transitory computer readable medium comprising code, executable by a processor, for implementing a method comprising:
   entering bankruptcy data associated with a bankruptcy proceeding after a debtor has filed for bankruptcy, wherein the bankruptcy data comprises precedence claim data associated with precedence claims, non-precedence claim data associated with non-precedence claims, and bankruptcy plan data, wherein the bankruptcy plan data comprises plan term information, plan base information, and monthly payment information;
   preprocessing the bankruptcy data, wherein preprocessing the bankruptcy data, which comprises the plan term information, plan base information, and monthly payment information, comprises correcting for inaccurate or missing data in the bankruptcy data, and creating standardized bankruptcy data in a standard data format;
   determining a present value associated with at least one non-precedence claim using the digital computer, and wherein the method further comprises, before entering the bankruptcy data,
   sending a request to a data center for the bankruptcy data, wherein sending the request to the data center for the bankruptcy data comprises sending a requestor file to the data center, wherein the requestor file includes proxy numbers associated with debtor account numbers, and wherein the method further comprises
   receiving a return file from the data center, wherein the return file comprises case file information, claim file information, creditor file information, payment file information, request out file information, and debtor file information; and
   wherein the request out file information includes a trustee ID.

17. The computer readable medium of claim 16 wherein the non-precedence claims comprise unsecured claims, and wherein the bankruptcy proceeding is a Chapter 13 proceeding.

18. The computer readable medium of claim 16 wherein the method further comprises:
   determining the present value associated with a single non-precedence claim, wherein the single non-precedence claim is an unsecured claim.

19. The computer readable medium of claim 16 wherein the method further comprises sending a request to a data center for the bankruptcy data.

20. The computer readable medium of claim 16 wherein the present value is associated with a specific unsecured claim; and wherein the method further comprises outputting the present value using an output device.

21. The computer readable medium of claim 16 wherein determining the present value comprises determining the present value of all non-precedence claims; and wherein the method further comprises outputting the present value on an output device.

22. A server computer comprising a processor and a computer readable medium coupled to the processor, the computer readable medium comprising code executable by the processor, for implementing a method comprising:

entering bankruptcy data into a digital computer, wherein the bankruptcy data comprises precedence claim data associated with precedence claims, non-precedence claim data associated with non-precedence claims, and bankruptcy plan data, wherein the bankruptcy plan data comprises plan term information, plan base information, and monthly payment information;

preprocessing the bankruptcy data, wherein preprocessing the bankruptcy data, which comprises the plan term information, plan base information, and monthly payment information, comprises correcting for inaccurate or missing data in the bankruptcy data, and creating standardized bankruptcy data in a standard data format; and determining a present value associated with at least one non-precedence claim using the digital computer, wherein the method further comprises, before entering the bankruptcy data, sending a request to a data center for the bankruptcy data, wherein sending the request to the data center for the bankruptcy data comprises sending a requestor file to the data center, wherein the requestor file includes proxy numbers associated with debtor account numbers, and wherein the method further comprises receiving a return file from the data center, wherein the return file comprises case file information, claim file information, creditor file information, payment file information, request out file information, and debtor file information; and wherein the request out file information includes a trustee ID.

23. A method comprising:

entering bankruptcy data associated with a plurality of different courts into a digital computer;

preprocessing the bankruptcy data, which comprises the plan term information, plan base information, and monthly payment information, wherein preprocessing includes standardizing the bankruptcy data received from different courts by correcting for inaccurate or missing data in the bankruptcy data, and creating standardized bankruptcy data in a standard data format; and determining a present value associated with at least one claim using the preprocessed data and the digital computer, wherein the method further comprises, before entering the bankruptcy data, sending a request to a data center for the bankruptcy data, wherein sending the request to the data center for the bankruptcy data comprises sending a requestor file to the data center, wherein the requestor file includes proxy numbers associated with debtor account numbers, and wherein the method further comprises receiving a return file from the data center, wherein the return file comprises case file information, claim file information, creditor file information, payment file information, request out file information, and debtor file information; and wherein the request out file information includes a trustee ID.

24. The method of claim 23 wherein the at least one claim is a secured, priority, or unsecured claim.

25. The method of claim 23 wherein preprocessing the bankruptcy data further comprises adjusting plan base information.

26. The method of claim 23 wherein preprocessing includes making assumptions for bad or missing data points in the bankruptcy data.

27. A non-transitory computer readable medium comprising code adapted to be executed by a processor to implement a method comprising:

entering bankruptcy data associated with a plurality of different courts into a digital computer;

preprocessing the bankruptcy data, which comprises the plan term information, plan base information, and monthly payment information, wherein preprocessing includes standardizing the bankruptcy data received from the plurality of different courts by correcting for inaccurate or missing data in the bankruptcy data, and creating standardized bankruptcy data in a standard data format; and determining a present value associated with at least one claim using the preprocessed data and the digital computer, and wherein the method further comprises, before entering the bankruptcy data, sending a request to a data center for the bankruptcy data, wherein sending the request to the data center for the bankruptcy data comprises sending a requestor file to the data center, wherein the requestor file includes proxy numbers associated with debtor account numbers, and wherein the method further comprises receiving a return file from the data center, wherein the return file comprises case file information, claim file information, creditor file information, payment file information, request out file information, and debtor file information; and wherein the request out file information includes a trustee ID.

28. The computer readable medium of claim 27 wherein the at least one claim is a secured, priority, or unsecured claim.

29. A server computer comprising a processor and a non-transitory computer readable medium coupled to the processor, the computer readable medium comprising code, executable by the processor for implementing a method comprising:

entering bankruptcy data associated with a plurality of different courts into a digital computer;

preprocessing the bankruptcy data, which comprises the plan term information, plan base information, and monthly payment information, wherein preprocessing includes standardizing the bankruptcy data received from the plurality of different courts by correcting for inaccurate or missing data in the bankruptcy data, and creating standardized bankruptcy data in a standard data format; and determining a present value associated with at least one claim using the preprocessed data and the digital computer, and wherein the method further comprises, before entering the bankruptcy data, sending a request to a data center for the bankruptcy data, wherein sending the request to the data center for the bankruptcy data comprises sending a requestor file to the data center, wherein the requestor file includes proxy numbers associated with debtor account numbers, and wherein the method further comprises receiving a return file from the data center, wherein the return file comprises case file information, claim file information, creditor file information, payment file information, request out file information, and debtor file information; and wherein the request out file information includes a trustee ID.

* * * * *